United States Patent [19]
Sagae

[11] 4,251,823
[45] Feb. 17, 1981

[54] INK JET RECORDING APPARATUS

[75] Inventor: Syoji Sagae, Hitachiota, Japan

[73] Assignees: Hitachi, Ltd.; Hitachi Koki Co., Ltd., both of Japan

[21] Appl. No.: 70,818

[22] Filed: Aug. 29, 1979

[30] Foreign Application Priority Data

Sep. 1, 1978 [JP] Japan .................. 53-106275

[51] Int. Cl.³ .......................... G01D 15/16
[52] U.S. Cl. .............................. 346/140 R
[58] Field of Search ........... 346/140 R, 140 PQ, 75

[56] References Cited
U.S. PATENT DOCUMENTS

| | | | |
|---|---|---|---|
| 3,848,258 | 11/1974 | Mahoney | 346/140 |
| 3,925,790 | 12/1975 | Fischbeck | 346/140 |
| 3,946,398 | 3/1976 | Kyser | 346/140 X |
| 4,161,670 | 7/1979 | Kern | 346/140 X |
| 4,189,734 | 2/1980 | Kyser | 346/140 X |

Primary Examiner—Joseph W. Hartary
Attorney, Agent, or Firm—Craig & Antonelli

[57] ABSTRACT

A multi-nozzle ink jet recording apparatus having a plurality of nozzle apertures arranged in parallel for generating ink droplets. Information signals as applied to respective electrical energy-mechanical energy converting elements associated with independent ink chambers in communication with the respective nozzle apertures to selectively generate from the nozzle apertures ink droplets necessary for recording in response to the information signals. The electrical signals applied to the converting elements associated with adjoining independent ink chambers are rendered mutually out of phase to thereby prevent generation of surplus ink due to interference between the adjoining independent ink chambers.

4 Claims, 5 Drawing Figures

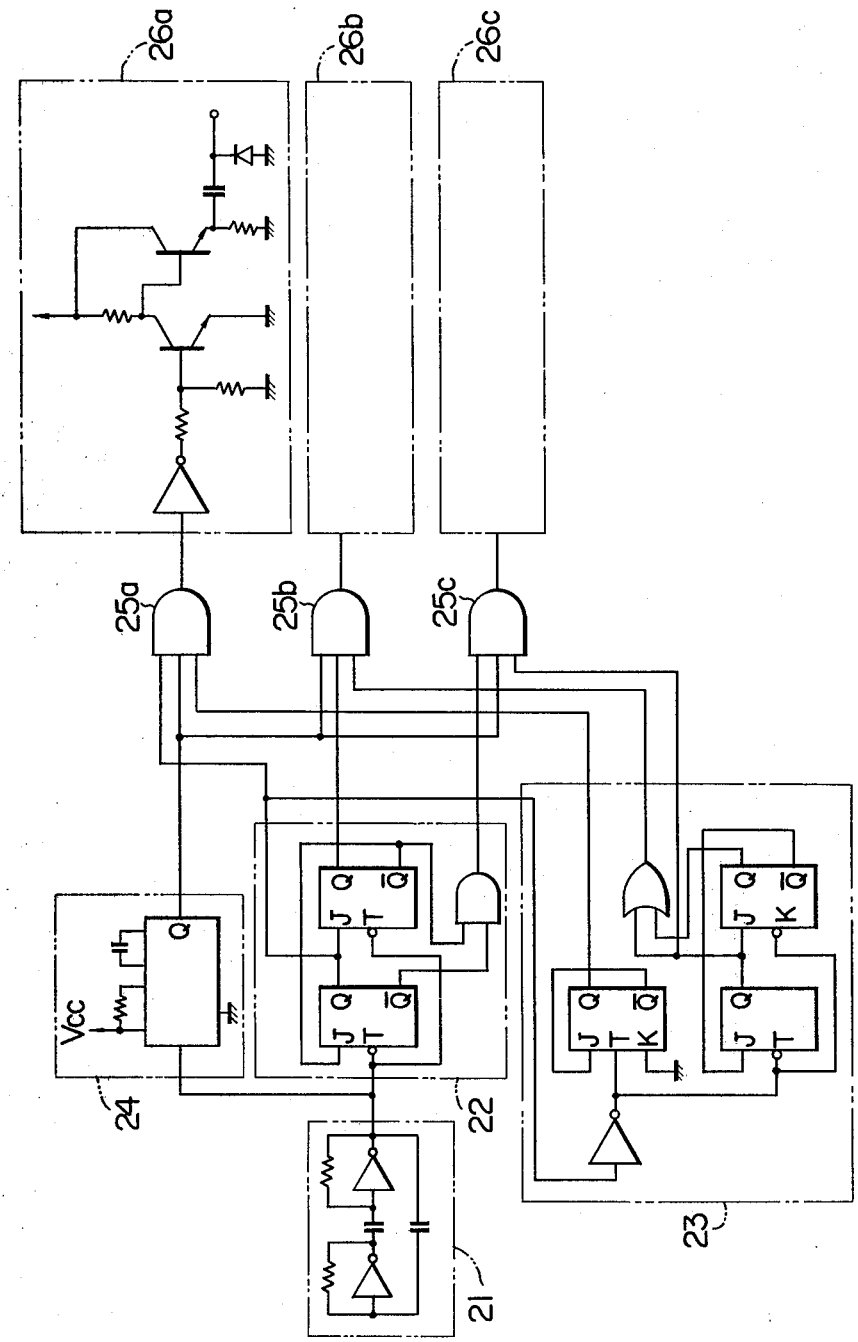
F I G. 4

INK JET RECORDING APPARATUS

BACKGROUND OF THE INVENTION

1. Field of the Invention

The present invention relates to ink jet recording apparatus and more particularly to a multi-nozzle ink jet recording apparatus wherein a picture or a character responsive to information signals is recorded on a recording medium through the use of ink droplets ejected from a plurality of nozzles.

2. Description of the Prior Art

Various types of ink jet recording apparatus have been proposed and practised wherein ink droplets are ejected from nozzles to record information on a recording medium.

One of them is of a generally called charge modulation type. In this type, an electrical energy-mechanical energy converting element (electrostrictive vibrator) is mounted on a nozzle head fed with ink and a high frequency voltage is applied to the element to vibrate the nozzle head so that the vibration generates ink droplets from the tip of the nozzle with the period of vibration. Simultaneously, the ink droplets are charged by information signals in synchronism with the generation of the ink droplets. The thus charged ink droplets are then deflected in accordance with their charges and recorded on a recording medium. Another is of the on-demand type as disclosed in U.S. Pat. No. 3,946,398, for example, which comprises ink chambers fed with ink, electrostrictive vibrators (PZT) provided for the ink chambers and a nozzle head provided with nozzle apertures in communication with the ink chambers for ejection of ink droplets, whereby the interior volume of the ink chamber is varied by an information signal applied to the electrostrictive vibrator to cause ink in the ink chamber to be ejected from the nozzle aperture in the form of a single ink droplet in response to the information signal, thereby recording desired information on a recording medium.

The printing speed of the latter type is inferior to that of the charge modulation type because the information signal is applied only when recording of the ink droplet is desired and the single ink droplet is ejected from the nozzle aperture of the nozzle head in response to the single information signal. This on-demand type ink jet recording apparatus is, however, advantageous in that the nozzle head itself is simplified and recovery of surplus ink droplets and deflection of the ink droplets are unnecessary, which results in miniaturization of the apparatus as a whole, and for these reasons, it has been highlighted as a compact type ink jet recording apparatus.

In practising the ink jet recording apparatus of on-demand type, it is general to arrange a plurality of ink chambers in parallel in the single nozzle head and to drive the respective ink chambers independently.

With this construction, however, upon simultaneous energization of electrostrictive vibrators associated with, for example, two adjoining ink chambers, the pressures of these electrostrictive vibrators are imparted to other chambers adjacent to the two ink chambers which are not scheduled to be energized with a result that so-called interference phenomenon is caused wherein minute ink droplets are generated from nozzle apertures which are in communication with those ink chambers which are not expected to participate in the generation of the ink droplets. Consequently, quality of pictures recorded on the recording medium is degraded.

SUMMARY OF THE INVENTION

The present invention contemplates to obviate the prior art drawbacks and has for its object to provide an ink jet recording apparatus which can prevent or at least suppress the interference of ink confined in a plurality of ink chambers arranged in parallel in a nozzle head.

To attain the above object, the present invention is featured in that driving voltage signals applied to electrostrictive vibrators associated with a plurality of neighbouring ink chambers are rendered multually out of phase for minimizing the interference of ink confined in adjacent ink chambers which is caused by pressures being imparted thereto.

BRIEF DESCRIPTION OF THE DRAWINGS

FIG. 4 is a circuit diagram of a driver for an ink jet recording apparatus embodying the present invention.

DESCRIPTION OF THE PREFERRED EMBODIMENTS

Figure 1:
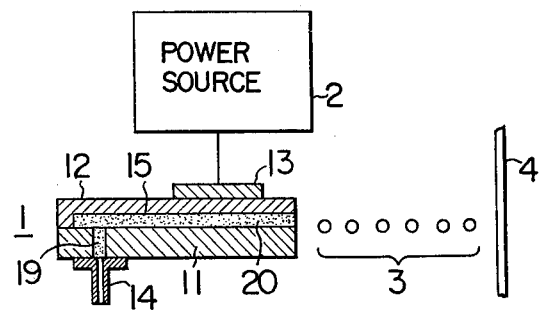
FIG. 1 is a side view, partially in section, of an ink jet recording apparatus of on-demand type.
Figure 2:
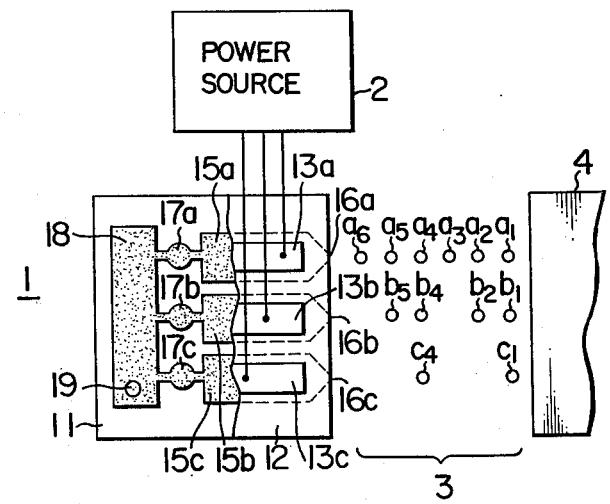
FIG. 2 is a plan view, partially in section, of the apparatus of FIG. 1.

Referring now to FIGS. 1 and 2, an ink jet recording apparatus of on-demand type to which the invention is applied will be outlined. The apparatus comprises a nozzle head 1, a power source 2 for driving electrostrictive vibrators, and a recording medium 4. Reference numeral 3 designates a group of ink droplets. The nozzle head 1 is comprised of a base plate 11, a top lid 12, electrostrictive vibrators 13a, 13b and 13c, and an ink supply pipe 14.

In the base plate 11 are formed fluid channels such as independent ink chambers 15a, 15b and 15c, nozzle apertures 16a, 16b and 16c, fluid diodes 17a, 17b and 17c, a common ink chamber 18, and an ink supply bore 19.

Bonded to the base plate 11 is the top lid 12 to which the electrostrictive vibrators 13a to 13c are bonded in register with the ink chambers 15a to 15c. The common ink chamber 18, fluid diodes 17a to 17c, ink chambers 15a to 15c and nozzle apertures 16a to 16c are filled with ink 20 fed from an ink reservoir, not shown, via the ink supply pipe 14 and ink supply bore 19.

When one of the electrostrictive vibrators 13a to 13c is supplied with a driving voltage signal having such a polarity as to decrease the interior volume of the associated ink chamber 15a, 15b or 15c, the ink pressure in this ink chamber is raised and an ink droplet 3 is ejected from the associated nozzle aperture 16a, 16b or 16c.

The fluid diodes 17a to 17c function to suppress propagation of the ink pressure created in the ink chambers 15a to 15c toward the common ink chamber 18 to a minimum and assure its preferential propagation toward the nozzle apertures 16a to 16c.

Figure 3:
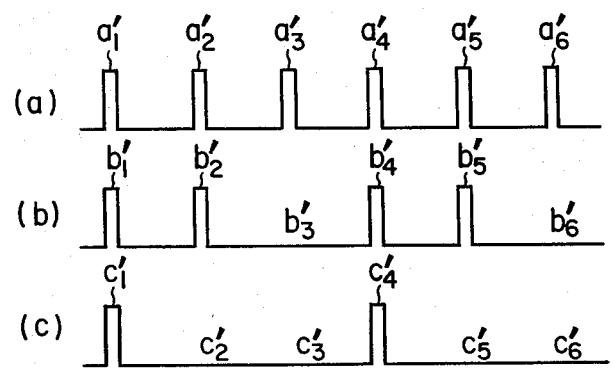
FIG. 3 is a waveform diagram of driving voltage signals in an apparatus of on-demand type previously developed.

To generate the group of ink droplets 3 as shown in FIG. 2, for example, driving voltages were conventionally been applied to the electrostrictive vibrators 13a to 13c in accordance with the teaching of FIG. 3.

More particularly, waveforms of driving voltage signals (a) to (c) in FIG. 3 are respectively applied to the electrostrictive vibrators 13a to 13c of FIG. 2. Upon application of a driving voltage $a_1'$ of the signal (a) in FIG. 3, an ink droplet $a_1$ as shonw in FIG. 2 is generated. Generation of other ink droplets corresponds to other driving voltages in a similar manner.

In this case, it is expected that ink droplets should not be generated at phases at which driving voltages $b_3'$, $b_6'$, $c_2'$, $c_3'$, $c_5'$ and $c_6'$ are absent but actually, minute ink droplets are generated at phases corresponding to the imaginary driving voltages $c_2'$ and $c_5'$ and deposited onto the recording medium 4, degrading picture quality. Such a defect is due to the fact that since the base plate 11 and top lid 12 are integral, vibrations of the electrostrictive vibrators 13a and 13b which are in phase responsive to driving voltages $a_2'$ and $b_2'$, and $a_5'$ and $b_5'$ also propagate to the ink chamber 15c (this phenomenon is called interference hereinafter), leading to a slight increase in the ink pressure in the ink chamber 15c.

Figure 5:
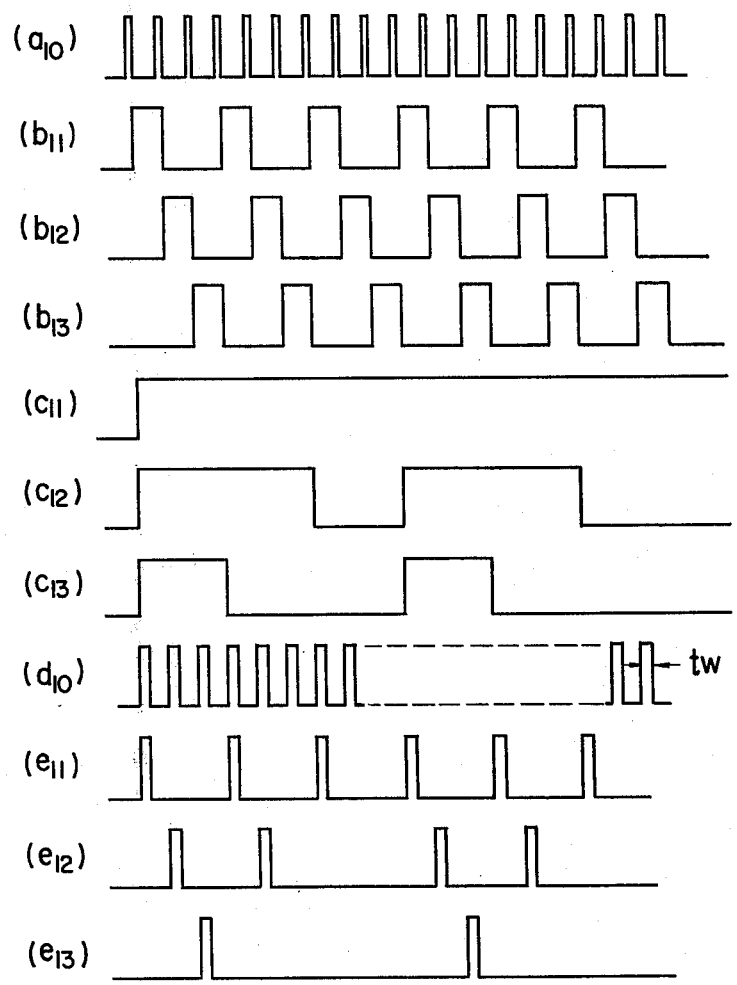
FIG. 5 is a waveform diagram of signals in the driver of FIG. 4.

Turning now to FIGS. 4 and 5, one embodiment of the invention will now be described which incorporates a driving power source 2 as shown in FIG. 4 operative with signal waveforms as shown in FIG. 5.

In FIG. 4, a clock generator 21 generates a clock pulse signal ($a_{10}$) shown in FIG. 5. A time setting circuit 22 comprised of a shift register, for example, generates output signals ($b_{11}$) to ($b_{13}$) shown in FIG. 5. A character signal source 23 comprised of a character generator and a driver circuit therefor delivers out signals ($c_{11}$) to ($c_{13}$) shown in FIG. 5 in response to a pattern of ink droplets 3 to be generated.

A time width setting circuit 24 generates pulse signal ($d_{10}$) shown in FIG. 5. Each pulse has a pulse with $t_w$ which is properly determined in accordance with the size of the ink chamber and the configuration of the electrostrictive vibrator. In an example illustrated herein, a single time width setting circuit is used in common to the electrostrictive vibrators but separate time width setting circuits may be provided for the electrostrictive vibrators.

Outputs of the time width setting circuit 24, time setting circuit 22 and character signal source 23 are ANDed at AND gates, i.e., three AND gates 25a, 25b and 25c in this example, and delivered therefrom as output signals ($e_{11}$) to ($e_{13}$) shown in FIG. 5.

Amplifier circuits 26a to 26c amplify the output signals of the AND gates 25a to 25c to a level sufficient to drive the electrostrictive vibrators 13a to 13c. Waveforms of the outputs of the amplifier circuits 26a to 26c are similar to those ($e_{11}$) to ($e_{13}$) and not illustrated herein.

As will be understood from waveforms ($e_{11}$) to ($e_{13}$) shown in FIG. 5, the driving voltage signals are rendered mutually out of phase so that a plurality of the driving voltage signals will not be applied to each one of the electrostrictive vibrator 13a, 13b or 13c at the same time, thus suppressing the interference and preventing the picture quality degradation due to the generation of minute ink droplets.

Under the application of the driving voltage signals for electrostrictive vibrators which are rendered mutually out of phase, information may be obliquely printed on the recording medium with respect to the transport direction of the recording medium. When correction for this oblique printing is desired, the nozzle head is arranged obliquely such that an electrostrictive vibrator supplied with a driving voltage signal of leading phase is displaced upstream in the transport direction of the recording medium and an electrostrictive vibrator supplied with a driving voltage signal of lagging phase is displaced downstream in that transport direction. Alternatively, the amplitude of the driving voltage signal is varied to regulate the projectile speed of the ink droplet such that the respective ink droplets can reach the recording medium simultaneously irrespective of the phase difference of the driving voltage signals.

The number of the nozzles is not limited three as in the foregoing embodiment but can be more than three. With the provision of more than three nozzles, it has been proven experimentally that the interference between nozzles which are spaced apart a distance corresponding to more than three nozzle-to-nozzle spacings can be negligible. Accordingly, a plurality of electrostrictive vibrators associated with nozzles which are mutually spaced in the order of more than three nozzle-to-nozzle spacings can simultaneously be supplied with the driving voltage signals.

As described above, according to the present invention, the interference between the nozzles can be eliminated to suppress the generation of minute ink droplets and recording pictures of high quality can be obtained.

I claim:

1. An ink jet recording apparatus comprising:
   a nozzle head including a common ink chamber, a plurality of independent parallel ink chambers spaced from the common ink chamber and having each a nozzle aperture at one end, and ink flow channels for communicating the common ink chamber with the respective independent ink chambers;
   electrical energy-mechanical energy converting elements associated with the respective independent ink chambers of the nozzle head;
   means for applying electrical signals to the respective converting elements to vary the interior volume of the respective independent ink chambers, for causing ink therein to be ejected from the respective nozzle apertures in the form of ink droplets in response to the electrical signals; and
   a recording medium opposing the nozzle head to receive the ink droplets ejected from the respective nozzle apertures,
   said means for applying the electrical signals to the converting elements causing the electrical signals applied to a plurality of adjoining converting elements of the nozzle head to be rendered mutually out of phase.

2. An ink jet recording apparatus according to claim 1, wherein said plurality of parallel independent ink chambers of the nozzle head comprises at least three ink chambers each of which is driven independently.

3. An ink jet recording apparatus according to claim 1, wherein said means for applying the electrical signal to the converting elements causes the timing for generation of the electrical signals to vary in accordance with the direction of movement of said nozzle head.

4. An ink jet recording apparatus according to claim 1, wherein the phases of the electrical signals applied to the plurality of converting elements are rendered different successively in the order of arrangement of the converting elements and, wherein said nozzle head is arranged obliquely such that a converting element supplied with an electrical signal of leading phase is displaced upstream in the transport direction of the recording medium and a converting element supplied with an electrical signal of lagging phase is displaced downstream in that transport direction.

* * * * *